Sept. 17, 1940. H. R. CRAGO Re. 21,569

CONTROL SYSTEM AND APPARATUS FOR HEATING

Original Filed Feb. 16, 1935 4 Sheets-Sheet 1

Inventor:
Harry R. Crago,
by Harry E. Dunham
His Attorney.

CONTROL SYSTEM AND APPARATUS FOR HEATING

Original Filed Feb. 16, 1935 4 Sheets-Sheet 2

Inventor:
Harry R. Crago,
by Harry E. Dunham
His Attorney.

CONTROL SYSTEM AND APPARATUS FOR HEATING

Original Filed Feb. 16, 1935 4 Sheets-Sheet 3

Inventor:
Harry R. Crago,
by Harry E. Dunham
His Attorney.

CONTROL SYSTEM AND APPARATUS FOR HEATING

Original Filed Feb. 16, 1935 4 Sheets-Sheet 4

Inventor:
Harry R. Crago,
by Harry E. Dunham
His Attorney.

Reissued Sept. 17, 1940

Re. 21,569

UNITED STATES PATENT OFFICE 21,569

CONTROL SYSTEM AND APPARATUS FOR HEATING

Harry R. Crago, Schenectady, N. Y., assignor to General Electric Company, a corporation of New York Original No. 2,129,526, dated September 6, 1938, Serial No. 6,829, February 16, 1935. Application for reissue June 21, 1939, Serial No. 280,357

30 Claims. (Cl. 236—1)

The present invention relates to control systems and apparatus adapted for controlling the operation of a plurality of automatic combustion heaters supplying a variable heating load, particularly a plurality of electrically operated oil fired boiler furnaces for supplying steam to a variable pressure load although certain features of the invention are not necessarily limited thereto.

One of the principal objects is to control automatically the number of heaters in operation in accordance with predetermined variations of the heating load. In this way the number of electrically operated oil fired boiler furnaces in operation may be varied in accordance with the variations in pressure of the steam load.

Another object is to obtain selectively different starting sequences for the plurality of heaters and thereby distribute the operating duty more uniformly among the various units without excessive wear and tear falling on any particular heater or groups of heaters.

It is also an object to provide under normal conditions a predetermined time delay in the starting of sucessive heaters into operation even though excessive increase of the heating load should occur. This prevents hunting action due to starting and then immediately stopping the heaters upon temporary load fluctuations.

A further object is to provide for rapid successive starting of the heaters into operation without any time delay under predetermined conditions such as excessively low steam pressures.

Another object is to effect the stopping of operation of any heater only upon a decrease of the heating load greater than the increase of the heating load required to effect the starting of operation of the heater This also serves to stabilize the number of heaters maintained in operation under quickly varying load conditions.

A still further object is to provide for removing any boiler furnace from its normal operating sequence and at the same time provide safety protection for each individual boiler furnace so removed as well as for the group of boiler furnaces remaining in sequential operating condition.

Another object is to provide a forced draft for a plurality of sequentially operated combustion heaters which is varied in accordance with the number of heaters operating and in adition provide for maintaining the draft substantially uniform independently of atmospheric conditions.

Figure 1:
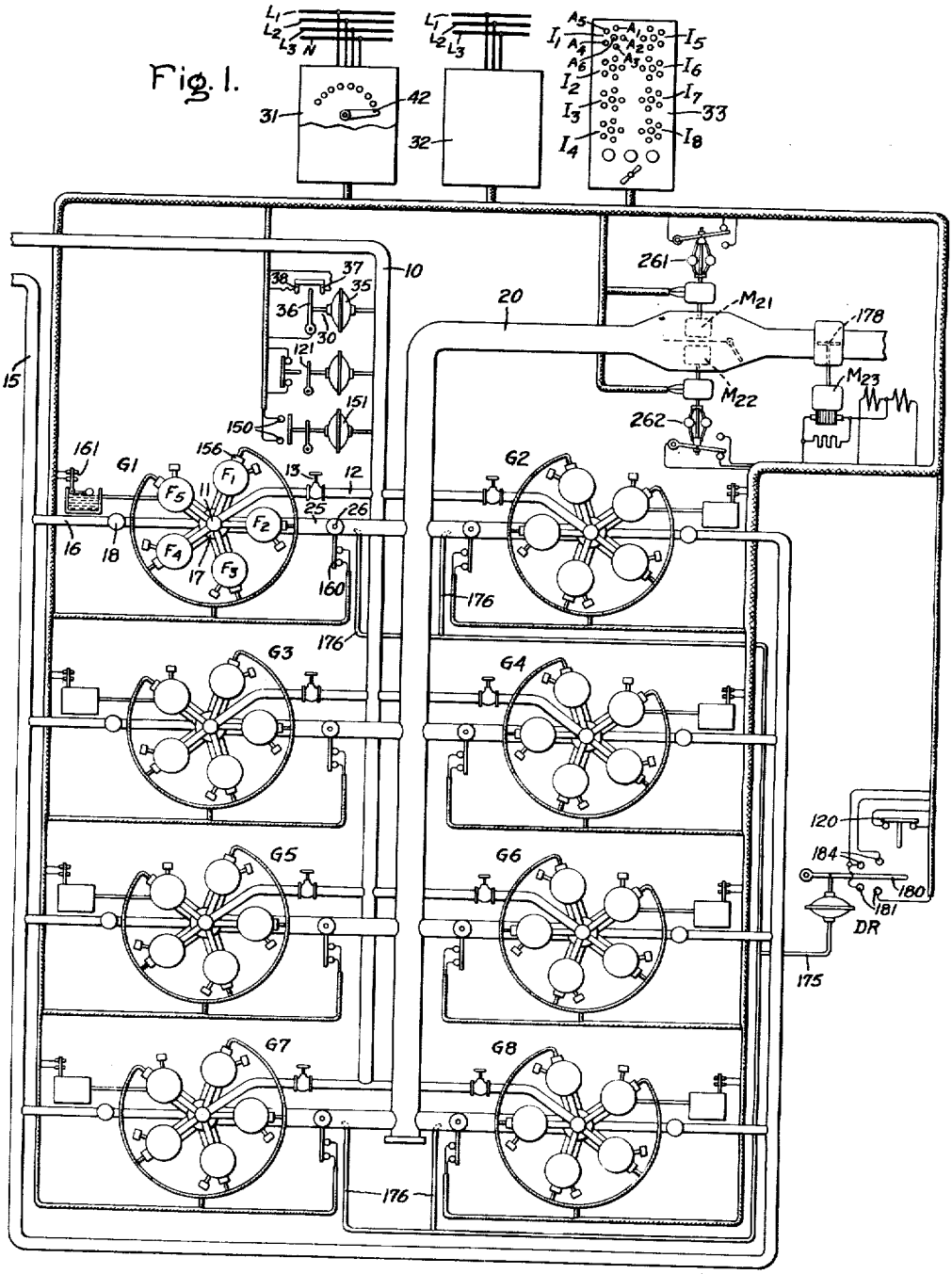
Figure 2:
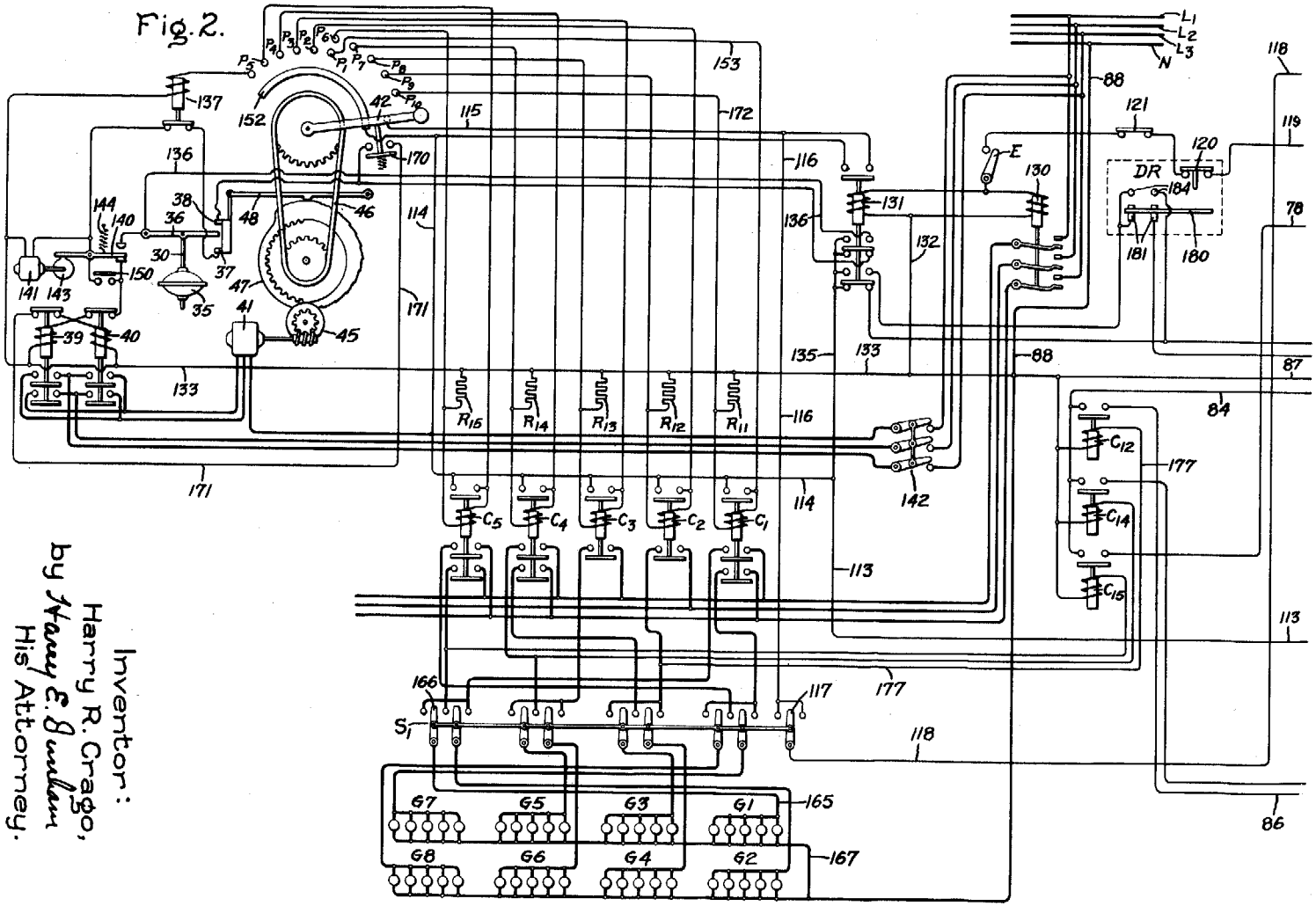
Figure 3:
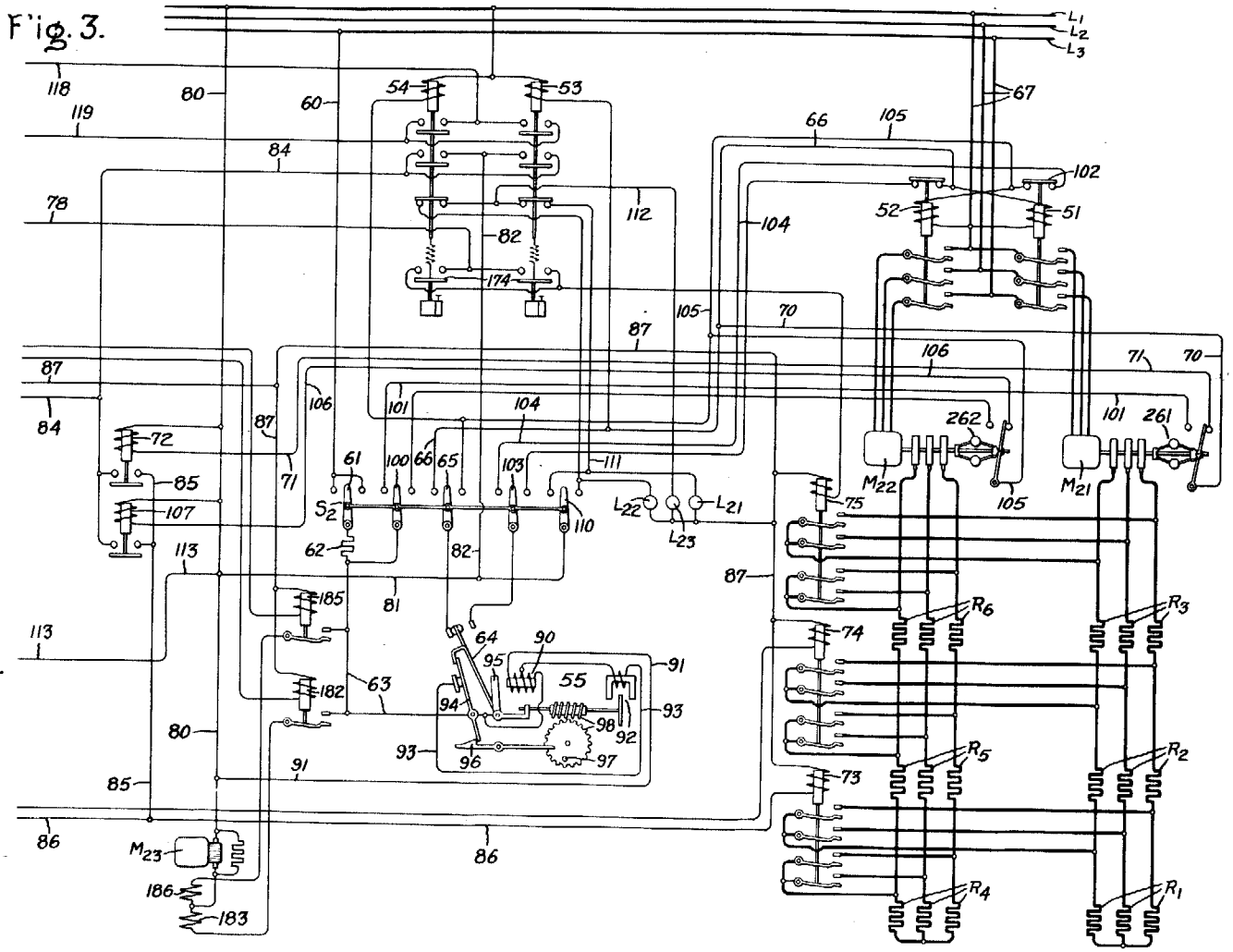
Figure 4:
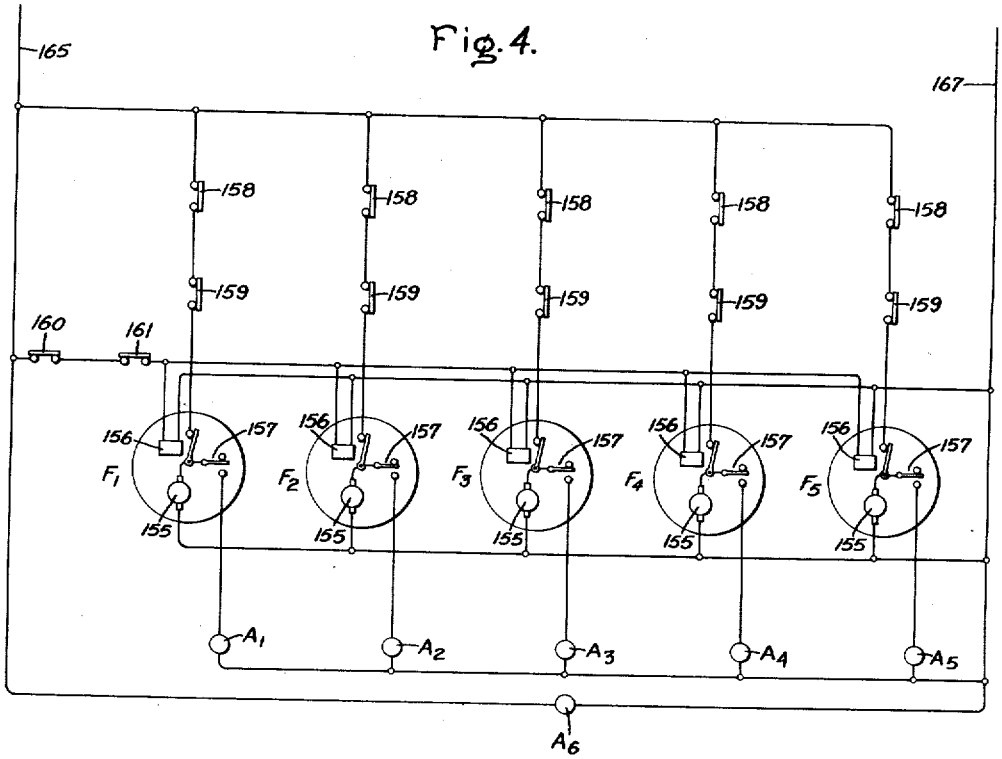

Further objects will appear from the following description of the accompanying drawings in which Fig. 1 schematically shows a preferred form of the improved control systems and apparatus of the present invention applied to a plurality of automatic combustion heaters supplying heat to a common heating load; Fig. 2 is a circuit diagram showing more clearly the details of the boiler furnace portion of the improved heater control system and apparatus of Fig. 1; Fig. 3 is a circuit diagram showing the details of the forced draft portion of the improved heater control system and apparatus of Fig. 1, the diagrams of Figs. 2 and 3 being complementary; and Fig. 4 is a circuit diagram showing the details of the indicating signal light control arrangement shown schematically in Fig. 1.

Referring to Fig. 1, several groups of boiler furnaces $G_1$ to $G_8$ are shown in the preferred form of the invention connected to supply steam to the steam main 10 although the present invention is not limited to group operation. The boiler furnaces $F_1$ to $F_5$ comprising group $G_1$ as well as the boiler furnaces comprising the other groups are shown interconnected by improved grouping means, more fully described and claimed in the copending application of Clyde C. Colby, Serial No. 758,276, filed December 19, 1934, and assigned to the assignee of my present invention.

Each of the boiler furnaces $F_1$ to $F_5$ as well as the other furnaces in Fig. 1 are illustrated as of the automatic electrically controlled oil fired type described and claimed in the copending application of Harry S. Woodruff, Serial No. 676,651, filed June 20, 1933, and assigned to the assignee of my present invention although the present invention may be used with any suitable type of automatic heater. Each boiler furnace is provided with suitable automatic electrically operated oil burner mechanism and control. The arrangement is such that upon energization of the control combustion is established automatically in the boiler furnace and upon deenergization of the control the combustion is stopped. One form of electric oil burner control apparatus suitable for this purpose is disclosed and claimed in the copending application, Serial No. 735,103, of John Eaton, filed July 14, 1934, and assigned to the assignee of my present invention.

Briefly, with the furnace grouping means shown, each of the furnaces $F_1$ to $F_5$ is connected to supply steam to the common steam drum 11 at the center of the group, which drum is connected to the steam main 10 by the steam feeder 12 having the manual shut-off valve 13 therein. The steam main 10 may be connected to supply steam to any variable load such, for example, as the steam heating radiators of a large building or of several smaller buildings. In such heating service, the condensate may be returned from all of the radiators through the return water line 15 which is connected through the pipe 16 with the common return water drum 17 for the group $G_1$ of boiler furnaces with the manual cut-off valve 18 located in pipe 16. Return water line 15 may be similarly connected to the other groups of furnaces.

The main flue pipe 20 having the electric motor driven forced draft fans $M_{21}$ and $M_{22}$ as well as the reversible electric motor operated draft regulating damper $M_{23}$ located therein is connected to the common flue pipe 25 of the group $G_1$ of boiler furnaces with the manually operable draft cutoff gate 26 located in the common flue pipe 25. Each of the other groups of furnaces $G_2$ to $G_8$ is connected to the main flue pipe 20 in a similar manner.

A master steam pressure responsive control device 30 is connected to operate in response to variations in the pressure of the steam main 10 due to variations in the heating load. The control panel 31 contains electrical controlling apparatus shown in detail in Fig. 2 which is operated under the control of the master controller 30 so as to start and stop operation of the various groups of boiler furnaces $G_1$, $G_2$ in accordance with the varying demands of the heating load. The control panel 12 contains the electrical control apparatus illustrated diagrammatically in Fig. 3 which is electrically connected with the control apparatus of panel 31 so as to operate the forced draft blowers $M_{21}$ and $M_{22}$ and the draft regulator $M_{23}$ to maintain proper draft conditions as the number of groups of furnaces operating is varied in accordance with the heating load.

The indicating panel 33 contains a number of groups of indicating electric lamps $I_1$ to $I_3$ which correspond in position and in arrangement with the various furnaces in the groups $G_1$ to $G_8$. In the manner explained hereinafter, the center light of each group is illuminated whenever the corresponding group of boiler furnaces is started into operation and the outer lights of each group are illuminated as the corresponding furnace in the group starts operation.

*Furnace group control*

The multiple furnace control apparatus shown in the diagram of Fig. 2 is controlled by the master steam pressure responsive device 30. This device is shown as of the type having a pressure responsive diaphragm inside of the casing 35 which raises and lowers the movable switch contact arm 36 upon an increase and decrease of the steam pressure in the steam main 10. A pair of spaced-apart contacts 37, 38 cooperate with contact arm 36 to energize the electromagnetically operated reversing switches 39 and 40 for the reversible electric motor 41.

The motor 41 rotates the dial switch arm 42 in each direction through the series of operating positions $P_1$ to $P_{10}$ in which a series of electromagnetically operated switches $C_1$ to $C_5$ are controlled for starting and stopping operation of the various groups of boiler furnaces $G_1$ to $G_8$ in sequence. The furnaces are started into operation in sequence upon movement of the dial arm 42 through positions $P_1$ to $P_5$ and are stopped successively upon the return movement of the dial arm 42 through the corresponding offset positions $P_6$ to $P_{10}$.

A manually operable sequencing switch $S_1$ is provided for selectively varying the operating sequence in which the groups of boiler furnaces $G_1$ to $G_8$ are started into operation under the control of the dial switch 42.

The reversible motor 41 drives the dial arm 42 through suitable speed reducing gearings 45 and the sprocket chain 46. A cam 47 is also driven through the reduction gearing 45 so as progressively to raise or lower the pivoted arm 48 upon the end of which the contacts 37 and 38 are carried. In this way the dial arm 42 is operated to each of the different positions $P_1$ to $P_{10}$ when the pressure responsive device 30 responds to different pressure values in the steam main 10.

*Forced draft control*

Before operation of any group of the boiler furnaces can be started, it is necessary that proper draft conditions be established in the main flue 20 by operation of one or the other of the electric motor-driven forced draft fans $M_{21}$ and $M_{22}$. As shown in Fig. 3 the manually operable selective switch $S_2$ is provided for starting operation of a selected one of the motor driven draft fans. The electric driving motors $M_{21}$ and $M_{22}$ of the fans are shown in Fig. 3 as of the three-phase variable speed type having the several groups of speed regulating resistors $R_1$ to $R_5$ their secondary circuits.

The forced draft fan motors $M_{21}$ and $M_{22}$ are controlled by the two line switches 51 and 52 having the cooperating relays 53 and 54 together with the timing relay 55 and the speed responsive switches 261 and 262 arranged so that whenever one of the forced draft fan motors is operating, upon failure thereof the other forced draft fan motor is automatically started into operation. The indicating lights $L_{21}$, $L_{22}$, and $L_{23}$ are provided to show the operating condition of the forced draft fans, either of the lamps $L_{21}$ or $L_{22}$ being illuminated when the corresponding forced draft fan $M_{21}$ or $M_{22}$ is started into operation under the control of the selective switch $S_2$. The lamp $L_{23}$ is illuminated whenever an automatic changeover has been effected due to failure of one of the forced draft fans.

*Operation*

Electric power is supplied from the three-phase lines $L_1$, $L_2$, $L_3$ with the neutral line N providing a suitable lower voltage for the control and indicating lamp circuit. To initiate operation of the electrically operated oil fired multiple boiler furnace steam plant illustrated in Fig. 1, the selective switch $S_1$ shown in Fig. 2 is moved either to the right or the left to establish the desired sequence of operation of the groups of boiler furnaces $G_1$ to $G_8$. The selective switch $S_2$ shown in Fig. 3 is then thrown either to the right or to the left to select either one of the forced draft blowers $M_{21}$ or $M_{22}$ for operation.

With selective switch $S_2$ moved to the left, an energizing circuit for the operating winding of the line switch 51 for the forced draft motor $M_{21}$ is established. This circuit extends from the supply line $L_3$ through conductor 60, blade 61 of the selective switch $S_2$, the circuit protecting fuse 62, conductor 63, the movable contact arm 64 of the timing switch 55, the blade 65 of selective switch $S_2$ in its left hand position, conductor 66 and thence through the operating winding of the line switch 51 and the left hand one of these three phase conductors 67 to the supply line $L_1$. Line switch 51 immediately closes to energize the motor $M_{21}$ from supply lines $L_1$, $L_2$, $L_3$. At the same time the operating winding of relay 53 is energized from conductor 66 in parallel with the operating winding of line switch 51 and the relay 53 therefore closes.

In order to insure rapid acceleration of the motor $M_{21}$, provision is made for cutting out the section $R_1$ of the speed controlling resistor until the motor $M_{21}$ has accelerated to running speed. This is accomplished in the following manner. When conductor 66 is energized to close the line switch 51, a circuit extending through conductor 70 and the contact of the speed responsive switch 61 in its right hand position as shown in the drawings, conductor 71 and the operating winding of the electromagnetic accelerating switch 72 and wire 80 to supply line $L_1$ is established.

Upon closure of accelerating switch 72, an energizing circuit for the operating winding of the electromagnetic switch 73 for short circuiting the resistors $R_1$, $R_4$ is established. This circuit may be traced from the supply line $L_1$ through conductors 80, 81, 82, the middle contact of relay 53, conductor 84, the contacts of switch 72, conductors 85 and 86, the winding of switch 73, conductor 87, and thence through conductor 88 to the neutral supply line. The resulting closure of switch 73 short circuits the resistor $R_1$ and thus enables the motor $M_{21}$ to accelerate quickly to running speed.

*Draft fan changeover operation*

When selective switch $S_2$ is moved to the left to energize the line switch 51 for the forced draft fan motor $M_{21}$ through a circuit including the conductor 63, at the same time the operating electromagnet 90 of the timing device 55 is energized, the circuit extending from conductor 63 through the winding of the electromagnet 90 and conductors 91 and 80. Likewise, the energizing winding of the induction disk timing motor 92 is energized from the midtap of electromagnet 90, conductor 93, movable contact arm 94 and conductor 63, the motor energizing winding being connected in parallel with a portion of the winding of the operating electromagnet 90. Energization of the operating electromagnet 90 attracts the armature 95 and thereby sets up a force to engage the gears 98 and also tends to move the contact arms 64 and 94 from the positions in which they are shown in the drawings. This latter, however, is prevented by the pivoted latch 96. However, after the induction disk motor 92 has been energized for the predetermined time interval sufficient to rotate the trip pin 97 through the agency of the speed reducing gears 98, latch 96 will be released and both contacts 64 and 94 will be operated from their position shown, the contacts 94 thereupon deenergizing the motor 92.

During the time interval required for operation of the timing device 55 to move the contact 64 from the position in which it is shown to its other position, the motor $M_{21}$ has had an opportunity to start from rest and accelerate up to running speed due to the resistor $R_1$ being short circuited. As soon as motor $M_{21}$ reaches running speed, the speed responsive switch 261 which is shown as of the centrifugal type operates its contact from the right hand position shown to the left hand position. The movement of switch 261 from the right hand position deenergizes the electromagnetic switch 72 and thereby effects deenergization of the switch 73 so as to reinsert the resistor $R_1$ in the motor circuit and thereby maintain the motor at the minimum running speed.

When the speed responsive switch 261 is moved to its left hand position, a circuit is established extending from line $L_3$ and conductor 60 through blade 61 of selective switch $S_2$, fuse 62 and blade 100, conductor 101, switch 261 in its left hand position, conductor 70, and thence through conductor 66 and the operating winding of line switch 51. This circuit maintains the operating winding of the line switch energized preparatory to the contact 64 of the timing device 55 being moved from the position in which it is shown after the predetermined time interval of operation of motor 92 mentioned above. Thus, after this interval, in case the fan motor $M_{21}$ should stop operation for any reason so that the speed responsive switch 261 is returned from its left hand position indicating normal running speed of the motor, the line switch 51 will immediately be deenergized.

When line switch 51 is deenergized due to stopping of the motor $M_{21}$, it operates to close its auxiliary contact 102. This immediately establishes an energizing circuit for line switch 52 so as to immediately start motor $M_{22}$ into operation. This circuit may be traced from line $L_3$ and conductor 60 through blade 61, fuse 62, conductor 63, contact 64 of timing device 55 in its right hand position, blade 103 of the selective switch $S_2$ in its left hand position, conductor 104, auxiliary contact 102 and thence through the operating winding of the line switch 52 to the left hand conductor 67 and line $L_1$.

Upon the deenergization of the operating winding of switch 52, the winding of relay 54 is energized in parallel therewith through the conductor 105. Thus when motor $M_{22}$ is initially energized, the speed responsive switch 262 in its position shown serves to complete a circuit from conductor 105 through conductor 106 to energize the electromagnetic switch 107. Closure of switch 107 serves to energize the resistance controlling switch 73 in substantially the same manner as previously described.

The indicating lamps $L_{21}$, $L_{22}$, and $L_{23}$ are connected so that when the selective switch $S_2$ is moved to the left to initiate operation of the forced draft blower motor $M_{21}$, a circuit extending from supply line $L_1$ through conductors 80, 81, blade 110, lamp 21 and conductors 87 and 88 is established. This results in illumination of the lamp $L_{21}$ to indicate that the forced draft fan motor $M_{21}$ is in operation. In case motor $M_{21}$ stops and line switch 51 and relay 53 are deenergized in the manner described above, the changeover indicating lamp $L_{23}$ is illuminated, the energizing circuit therefor extending through blade 110, conductor 111, the lower contact of relay 53, conductor 112, lamp $L_{23}$ and thence through conductors 87 and 88 to the neutral supply line. This enables an attendant to inspect the motor driven draft fan $M_{21}$ and determine the cause of the automatic changeover.

Whenever the selective switch $S_2$ is moved to the right hand position instead of left hand as previously assumed, the forced draft fan motor $M_{22}$ and indicating light $L_{22}$ are energized in substantially the same way as the motor $M_{21}$ and light $L_{21}$ with the speed responsive switch 262, contactor 107 and the timing device 55 functioning in practically the same manner as previously described. Also upon any failure resulting in stopping of the motor $M_{22}$, the speed responsive switch 262 serves to effect automatic changeover to the motor $M_{21}$ in practically the same way as previously described, at the same time causing illumination of the changeover indicating light $L_{23}$.

*Furnace operation*

Before starting operation of the boiler furnaces, one of the forced draft fan driving motors $M_{21}$ or $M_{22}$ must be in operation and the corresponding one of the relays 53, 54 energized in the manner previously described. Also, a safety control circuit must be established from the line $L_1$ through conductors 80, 113, 114, the dial switch arm 42 in the off position shown, conductors 115 and 116, blade 117 of the selective switch $S_1$ in either of its positions, conductor 118 and the upper contact of one of the relays 53 or 54, conductor 119, contact 120 of the draft responsive device DR, contact 121 of the steam pressure responsive safety switch shown in Fig. 1 connected to the main steam line 10, the manually operable emergency switch E which must be in the closed position and thence through the operating windings of electromagnetic switches 130 and 131 in parallel and through conductors 132, 133 and 88 to the neutral supply line.

In this way, it is insured that both the line contactor 130 and the master control contactor 131 can be closed only under the following conditions:

(1) One of the forced draft fans $M_{22}$ and $M_{21}$ must be in operation, (2) The draft must be above a minimum safe value as determined by the draft regulator DR, (3) The pressuer existing within the steam main 10 must be below the maximum safe value, (4) The manually operable emergency switch E must be in the closed position, (5) The manually operable sequence selecting switch $S_1$ must be operated to one of its circuit closing positions, (6) The dial switch arm 42 must be in the off position as shown in Fig. 2.

As soon as the master control contact 131 is closed the upper contact thereof shunts the contact controlled by the dial switch 42 in the off position. This maintains the continuity of the safety control circuit traced above when the dial switch arm 42 is operated from the off position to start the groups of furnaces into operation. In this way, undervoltage protection is provided since the contactor 131 will drop out upon voltage failure or reduction of the voltage to an unsafe value and thereby require the return of the dial switch arm 42 to the off position before the safety control circuit can again be completed.

Assuming after a shut down of all the furnaces, there is no pressure in the steam main 10. Hence, the pressure responsive device 30 will maintain the contact arm 36 into engagement with the cooperating contact 37. This establishes an energizing circuit for the electromagnetic switch 39 to operate the control motor 41 in the direction to move the down switch arm 42 in a counter-clockwise direction so as to start a group or groups of the boiler furnaces into operation to supply steam.

The circuit for switch 39 may be traced from the supply line $L_1$ through conductors 80, 113, 135, the middle contact of the master control switch 131 in its upper position, conductor 136, switch arm 36, contact 37, the contacts of the electromagnetic limit switch 137, the timing contact 140 of the timing device 141, the upper contacts of the electromagnetic switch 40, the winding of electromagnetic switch 39 and conductor 133 to the neutral supply line N. Upon the resulting closure of electromagnetic switch 39, the motor 41 is energized from the supply lines $L_1$, $L_2$, $L_3$ through the line switch 130, and the disconnecting switch 142 in the closed position. Thereupon motor 41 operates to move the dial switch arm 42 from the off position in the counter-clockwise direction.

The electroresponsive timing device 141 is energized at the same time as the winding of the electromagnetic switch 39, being connected in parallel therewith through the timing contact 140. In the preferred form shown the timing device 141 is a self-starting synchronous motor driving the timing cam 143. After a relatively short time interval of operation of the timing cam 143, the timing contact 140 is disengaged from its lower co-operating contact and operated into engagement with its upper co-operating contact by the biasing spring 144, thus maintaining the timing device 141 energized.

In connection with the timing device, it should be noted that the timing cutout contact 150 is maintained in the open position shown by means of the steam pressure responsive device 151 only when the pressure in the steam main 10 is above a predetermined minimum value. Thus, after normal operating conditions are established, the operation of the timing contact 140 from its lower position will deenergize the electromagnetic switch 39 and thereby stop operation of motor 41. However, the timing device 141 will be maintained energized and continue to operate timing cam 143 so as to reengage the timing contact 140 with its lower contact after a predetermined time interval has elapsed. This will reenergize electromagnetic switch 39 and restart the operation of motor 41 to advance the dial switch arm 42. In this way, under normal conditions, the timing device 41 will continue to operate the timing contact 140 so as to periodically interpose a time delay in the advancement of the dial switch arm 42 in the clockwise direction.

However, in starting operation, when the pressure in the steam main 10 is below the predetermined minimum value, the timing cutout contact 150 is maintained closed. This renders the timing device 141 entirely ineffective to interpose the time delay in the operation of the dial switch arm 42 in the counter-clockwise direction since the electromagnetic switch 39 is maintained energized through contact 150 even though the timing contact 140 is operated to its upper position.

Thus in starting, the dial switch arm 42 is rapidly advanced to position $P_1$. Thereupon, the relay $C_1$ is energized, the circuit extending from $L_1$ through conductors 80, 113, 114, segment 152, contact $P_1$, conductor 153, the winding of relay $C_1$ resistor $R_{11}$, and conductor 133 to the neutral supply line N. Upon closure of relay $C_1$, the upper contact thereof establishes a holding circuit for the relay $C_1$ directly to conductor 114 and independent of the dial switch arm 42.

Upon closure of relay $C_1$, two groups of the electrically operated oil fired boiler furnaces are started into operation, the particular groups depending upon the position of the selective switch $S_1$. With the switch $S_1$ in its left hand position, the furnace groups $G_1$ and $G_8$ are energized upon closure of the relay $C_1$.

*Group control circuits*

Fig. 4 illustrates diagrammatically a control circuit arrangement suitable for the automatic furnaces in each group. In this arrangement, each of the furnaces is provided with an electric motor operated oil burner mechanism 155, a control mechanism 156, and a combustion responsive device 157. These may be of any ordinary type although the forms shown are intended to represent diagrammatically apparatus such as disclosed in the copending application, Serial No. 735,103, of John Eaton, filed July 14, 1934, and assigned to the assignee of my present invention.

Each furnace control mechanism includes a pair of safety switches 158 and 159. While not shown in detail the safety switch 158 is arranged under normal conditions to remain in the closed position as shown but to be operated to the open position to deenergize the burner mechanism 155 upon the occurrence of excessive or dangerous pressures in the combustion chamber of the oil furnace. Such a safety switch arrangement is disclosed and claimed in Patent 1,987,447 of W. O. Lum, granted January 8, 1935, and assigned to the assignee of my present invention.

The safety switch 159 also under normal conditions remains in the closed position as shown but is operated to the open position to deenergize the burner mechanism 155 upon the occurrence of excessive steam pressure in the boiler furnace. Any ordinary form of safety pressure switch may be employed.

As shown in Figs. 1 and 4, each group of boiler furnaces is provided with a draft damper safety switch 160. This switch is normally maintained in the closed position as shown as long as the damper remains in the fully open position. When the draft damper in the common flue pipe 25 for the group of boiler furnaces is closed, switch 160 is opened. Thus, the draft damper safety switch prevents operation of any furnace in the group except when the common flue pipe draft damper is opened.

Also as shown in Figs. 1 and 4, one of the boiler furnaces in each group is provided with a low water level safety switch 161. As long as the water level in the boiler group remains at or above normal value, switch 161 is maintained closed. When the water level falls to a dangerously low value, the switch 161 is opened. This either stops or prevents operation of the oil burner mechanisms of all furnaces in the group.

Thus, with the group control circuit arrangement shown in Fig. 4, when relay $C_1$ is closed upon operation of the dial switch arm 42 to position $P_1$, the group of boiler furnaces $G_1$ is started into operation provided all of the safety switches 158, 159, 160 and 161 associated therewith are in the closed position indicating normal operating conditions. To energize the furnace group $G_1$, the conductor 165 is connected through switch blade 166 of the selective switch $S_1$ in its left-hand position, the middle contact of relay $C_1$ and the upper contacts of line switch 130 to the supply line $L_1$. The conductor 167 is connected directly to the neutral supply line N.

When, as shown in Fig. 4, the group of furnaces $G_1$ is started into operation, an energizing circuit is established through conductors 165 and 167 for the group signal light $A_6$. This light is located in the center of the indicating group $I_1$ as shown in Fig. 1. Thus, the lighting of the group indicating light $A_6$ indicates to the operator that the corresponding group of oil furnaces $G_1$ has been called into operation. At the same time a circuit is established from conductor 165 through the safety switches 160 and 161 to energize the electric control mechanism 156 of each of the furnaces $F_1$ to $F_5$ in parallel circuit. Each of the control mechanisms 156 at once starts operation to run the electric motor driven oil burner mechanism 155 so as to establish combustion in the corresponding furnace $F_1$ to $F_5$. As soon as combustion is successfully established in each furnace, the combustion responsive switch 157 of that furnace responds to energize the corresponding one of the individual furnace indicating lights $A_1$ to $A_5$. These individual furnace indicating lights are arranged around the central furnace group indicating lights $A_6$ so as to correspond to the physical arrangement of the furnaces $F_1$ to $F_5$ as shown in Fig. 1. Thus as each of the lights $A_1$ to $A_5$ is lighted, the operator knows that the corresponding furnace has established combustion and is in proper operation. In case one of the lights $A_1$ to $A_5$ fails to light, the operator at once knows that the corresponding furnace has failed to establish combustion. This facilitates an immediate inspection of any defective furnace to determine the cause of failure and the necessity of repairs or adjustments.

The group of furnaces $G_8$ is connected and arranged to be energized upon closure of relay $C_1$ in substantially the same way as the group of furnaces $G_1$ indicated in Fig. 4.

*Group sequencing*

If the heating load conditions are such that operation of the two groups of furnaces $G_1$ and $G_8$ will supply sufficient steam to the steam main 10 to balance the demand, then the pressure responsive device 35 will operate to disengage the contact arm 36 from the contact arm 37. This opens the circuit extending from the contact 37 through the limit switch 137 to the timing device 141. However, as long as the timing contact 140 remains in engagement with its upper co-operating contact, the timing device 141 will continue to operate until the timing cam 143 is rotated to move the timing contact 140 out of engagement with its upper contact. Thereupon the timing motor 141 is deenergized and the furnace groups $G_1$ and $G_8$ continue to supply the load requirements of steam main 10.

In case the load increases, the pressure in the steam main 10 will be decreased. As a result, the steam pressure-responsive switch contact 36 is reengaged with contact 37. Thereupon the timing motor 141 and the control motor 41 are again energized in the manner previously described. The control motor 41 immediately starts to advance the dial switch arm 42 from position $P_1$ in the counter-clockwise direction. When the dial switch arm 42 reaches the position $P_2$, relay $C_2$ is energized in substantially the same way as previously described in connection with relay $C_1$. Thereupon, the timing device 141 disengages contact 140 from its lower co-operating contact and thus temporarily stops further advance of the dial switch arm 42 in the counter-clockwise direction by deenergizing the switch 39 and the control motor 41. The timing cam 143 is formed so as to permit the contact 140 to remain in engagement with its lower co-operating contact only for the time interval required for operation of the dial switch arm 42 from one position to the next adjacent position. Thus, after a predetermined time delay, the timing device 141 reengages the timing contact 140 with its lower co-operating contact to reenergize the control motor 41 and advance the dial switch arm 42 to the next adjacent position.

In this way, relays $C_3$, $C_4$, $C_5$ are successively energized when the dial switch arm 42 is advanced after successive time delay periods to positions $P_3$, $P_4$, $P_5$, provided the pressure in the steam main 10 continues to remain below the value required for the pressure-responsive device 35 to disengage pressure switch 36 from contact 37. The provision of the time delay after advancement of the dial switch arm between adjacent positions reduces hunting action as it enables each group of furnaces to start into operation and contribute to the supply of steam to the steam main 10 for a predetermined time interval before the next group of oil furnaces is started.

The successive energization of relays $C_1$, $C_2$, $C_3$, $C_4$, and $C_5$ serves to bring successively all groups of the oil furnaces into operation. The particular sequence of starting the groups of furnaces into operation is determined by the position of the selective switch $S_1$. With the selective switch $S_1$ in its left hand position, relay $C_1$ controls the furnace groups $G_1$ and $G_8$; relay $C_2$ controls furnace group $G_3$; relay $C_3$ controls furnace group $G_5$; relay $C_4$ controls furnace groups $G_4$ and $G_6$ ; and relay $C_5$ controls furnace groups $G_2$ and $G_7$. With the selective switch $S_1$ in its right hand position, relay $C_1$ controls furnace groups $G_2$ and $G_7$; relay $C_2$ controls furnace group $G_4$; relay $C_3$ controls furnace group $G_6$; relay $C_4$ controls furnace groups $G_3$ and $G_5$; and relay $C_5$ controls furnace groups $G_1$ and $G_8$.

It is important to note that as the dial switch arm 42 is advanced through the series of positions $P_1$ to $P_5$ the cam 47 operates to lower the arm 48 in steps corresponding to the positions of the dial switch arm 42, thereby decreasing the value of the steam pressure in main 10 at which the pressure contact arm 36 is operated out of engagement with the contact 37. As a result, the pressure in the steam main 10 is changed from a maximum operating value to a minimum operating value. For ordinary heating service these values may be assumed to be eight pound steam pressure for the minimum value and eleven pound steam pressure for the maximum value although other values may be employed as described. With the 8 to 11 pound normal operating range of steam pressures for device 35, the timing cutout pressure switch 151 may be set to close its contact at the subnormal pressure of seven pounds and the excess pressure switch 121 may be set to open its contact at twelve pounds.

The safety steam pressure switches 159 for the individual boiler furnaces may be set to open at fourteen pounds. Then the pop valves ordinarily provided under safety rules on each individual boiler furnace may be set to open at fifteen pounds.

In case the heating load on the steam main 10 decreases, the pressure in the steam main will rise due to the fact that the number of furnaces then in operation will supply more steam than is required to balance the load demand. As soon as the steam pressure rises sufficiently for the pressure responsive device 35 to operate the pressure contact 36 into engagement with the upper co-operating contacts 38, a circuit is established from supply line $L_1$ through conductors 80, 113, 135, upper contacts of switch 131, conductor 136, switch contact 36 and 38, limit switch 170 in the closed position, conductor 171, the upper contact of switch 39, the operating winding of switch 40 and thence through conductor 133 to the neutral supply line. The resulting closure of switch 40 energizes motor 41 for operation in the direction required to rotate the dial switch arm 42 in the clockwise direction.

In case the dial switch arm 42 has been operated in the counter-clockwise direction to position $P_5$ to energize the relay $C_5$, this relay will remain energized until dial switch arm 42 is returned in the clockwise direction to position $P_6$. The deenergization of relay $C_5$ is accomplished by short circuiting the relay windings. The resistor $R_{15}$ serves to limit the current where the relay winding is short circuited. Similarly, as positions $P_7$, $P_8$, $P_9$, and $P_{10}$ are reached by the clockwise movement of the dial switch arm 42, the corresponding relays $C_4$, $C_3$, $C_2$, and $C_1$ will be successively deenergized by short circuiting the operating winding of the relay.

Referring specifically to relay $C_1$, this relay was energized when the dial switch arm 42 was operated in a counter-clockwise direction to position $P_1$, the energizing circuit extending from conductor 114 through the segment 152, dial switch arm 42, contact $P_1$ and conductor 153 and thence through the winding of relay $C_1$ and resistor $R_{11}$ to the conductor 133. When relay $C_1$ closes, the upper contact thereof establishes a holding circuit directly from conductor 114 through the relay winding and resistor $R_{11}$ to conductor 133. Upon the movement of the dial switch arm 42 in the clockwise direction to position $P_{10}$, the winding of relay $C_{11}$ is short circuited through a circuit extending from the conductor 114, the segment 152, contact $P_{10}$, conductor 172 to the midpoint between the relay winding and the resistor $R_{11}$. When relay $C_1$ opens due to the short circuiting of the operating winding thereof, the upper contact of the relay interrupts the holding circuit through which the relay has previously been maintained energized. The short circuiting of the other relay windings is accomplished in substantially the same way.

With the relay energizing and short circuiting arrangement just described, the dial switch arm 42 is operated through one series of positions to energize the relays and through an entirely different series of positions to deenergize the relays. This arrangement prevents temporary increases in the pressure in the steam main 10 from causing groups of the oil furnaces to be shut down as it requires a considerable interval of time for the dial switch arm 42 to be operated by the control motor 41 from the position at which any particular group of furnaces is started into operation to the different position at which the particular group is shut down. If during this interval the steam pressure returns to its initial value, the movement of the dial switch arm 42 in the counter-clockwise direction is stopped so that the deenergizing position for the particular group of furnaces concerned will not be reached.

*Draft regulation*

As the number of groups of furnaces supplying steam to the steam main 10 is varied automatically to meet the load demands, the volume of the products of combustion from the furnaces supplied to the main flue pipe 20 is varied correspondingly. Hence, to maintain proper operating conditions, it is desirable that the forced draft be controlled substantially in accordance with the number of furnaces operating and that the draft never be permitted to fall below a predetermined minimum value.

As shown in Fig. 1, the draft regulator DR is connected by the main pipe 175 and the four branches pipes 176 so as to be responsive to draft conditions at a plurality of symmetrically located points in the flue piping system for the furnaces. This provides an indication of the average draft condition for all the furnaces. When this average draft condition falls below the minimum operating valve, the draft regulating device DR operates to open the contact 120. With contacts 120 open it is impossible to complete the safety circuit through which the control contactor 131 and the line switch 130 for the furnace groups are energized.

In the arrangement shown in the drawings, the low speed operation of either forced draft fan is sufficient to maintain the draft above the minimum operating value as long as no more than two groups of furnaces are operating. Thus when the relay $C_1$ is closed to start operation of furnace groups $G_1$ and $G_8$ or $G_2$ and $G_7$ depending upon the position of the selective switch $S_1$, the forced draft fan continues in operation at the minimum speed.

However, when relay $C_2$ is energized to start operation of an additional group of furnaces, the draft fan speed control relay $C_{12}$ is energized. This relay in turn energizes the electromagnetic switch 73 to short circuit speed regulating resistors $R_1$, $R_4$ and thereby increase the speed of the forced draft fan. Relay $C_{12}$ is energized through a circuit extending from the neutral supply line, conductor 87, the winding of relay $C_{12}$, conductor 177, the lower contact of relay $C_2$ in the closed position to supply line $L_2$. The resistor controlling contactor 73 is energized by a circuit extending from the neutral supply line, conductor 87, the winding of contactor 73, conductor 86, the contacts of relay $C_{12}$, conductor 84, the middle contact of one of the electromagnetic switches 53 or 54, and thence through conductors 82, 81 and 80 to supply line $L_1$.

The increased draft in the main flue pipe 20 due to the increased speed of the draft motor is then sufficient to take care not only of the group of furnaces added by closure of relay $C_2$ but also the additional group of furnaces added by closure of relay $C_3$. However, when relay $C_4$ is closed to start two additional groups of furnaces into operation, the relay $C_{14}$ is energized. Relay $C_{14}$ in turn energizes the speed resistor controlling switch 74 so as to short circuit the resistors $R_2$ and $R_5$ and thereby further increase the speed of the forced draft fan which is operating. The draft due to the increased fan speed is then sufficient to take care of the two additional groups of furnaces controlled by relay $C_4$. Likewise, when relay $C_5$ is closed to start the remaining two groups of furnaces into operation, relay $C_{15}$ and electromagnetic switch 75 are energized to effect the short circuiting of the resistors $R_3$, $R_6$ and thereby increase the speed of the draft fan to the maximum value. As the energizing circuits for relays $C_{14}$ and $C_{15}$ are substantially the same as for relay $C_{12}$ and as the energizing circuit for resistance controlling switches 74 is substantially the same as for switch 73, these circuits will be apparent from the drawings without tracing in detail.

The energizing circuit for the resistance controlling switch 75 extends through the contacts of relay $C_{15}$, conductor 173, and either one of the two time delay auxiliary contacts 174 with which the electromagnetic switch 53 and 54 are provided and thence through the operating winding of electromagnetic switch 75 to conductor 78. The two time delay auxiliary contacts 174 are provided in order to prevent immediate closure of resistance controlling switch 75 in case selective switch $S_2$ is thrown quickly from one position to the other with the draft fan operating at maximum speed. The delayed closure of switch 75 insures that neither draft fan motor can be started with all the secondary resistance cut out.

As the relays, $C_5$, $C_4$, $C_2$, are energized or de-energized to start and stop operation of the groups of boiler furnaces controlled thereby, it will be seen that the speed of the forced draft fan is varied substantially in accordance with the number of heaters operating. This serves to maintain the draft above the minimum operating condition at all times.

In order further to control draft conditions, the reversible motor $M_{23}$ is provided for operating the draft gate 178 to maintain the draft between definite operating limits. The reversible motor $M_{23}$ is controlled by the draft circulating device DR. Whenever the draft increases to the maximum operating value, the switch arm 180 is moved into engagement with the contacts 181 so as to operate the reversible motor $M_{23}$ in the direction required to close the gate valve 178. The circuit controlled by switch 180 extends from the supply line $L_1$ through conductors 80, 113, 135, the lower contact of switch 131 in its upper position, contacts 181 and thence through the operating winding of the electromagnetic switch 182 and conductor 87 to the neutral supply line. Closure of said switch 182 energizes the motor $M_{23}$ through the field winding 183 to effect operation thereof in the direction tending to close the gate valve 178. As the valve closes the draft is restricted and the draft regulator at once responds to disengage the contact 180 from the contact 181 and thereby stop operation of the motor $M_{23}$.

Whenever the draft decreases to the minimum operating value, the contact arm 180 is operated into engagement with the contact 184 to energize the electromagnetic switch 185. Closure of switch 185 energizes the motor $M_{23}$ through the field winding 186 to effect operation of the motor in the direction tending to open the gate valve 178.

Thus in addition to the variation of the speed of the forced draft fan in accordance with the number of furnaces operating, the draft is further controlled by the gate valve 178 at each operating speed of the forced draft motor so as always to maintain the draft within the proper operating limits.

What I claim as new and desire to secure by Letters Patent of the United States is:

1. The combination of a plurality of boiler furnaces connected to supply steam to a common header and each boiler furnace having an electrically operated oil burner mechanism for establishing combustion to generate steam therein, means operable responsively to predetermined variation of the steam pressure in said header, sequencing switch mechanism including a reversible motor operated sequencing switch controlled by said pressure responsive means, a series of separately operable electromagnetic switches controlled by said sequenching switch, and a multiple contact reversing switch interconnected with said electromagnetic switches for controlling the energization of said oil burner mechanisms to start and stop operation thereof in reversible sequences to regulate the steam pressure.

2. In combination, a plurality of automatic combustion heaters connected to a common heating load, control means responsive to predetermined variations in said heating load and having a sequencing device controlled thereby for starting and stopping operation of said heaters in a predetermined sequence and a timing device periodically starting and stopping operation of said sequencing device, and automatic means for rendering said timing device ineffective in the sequential starting of said heaters upon a predetermined abnormal variation in said load.

3. In combination, a plurality of devices for supplying a common load, timed sequencing control means responsive to predetermined variations in said load for starting and stopping operation of said devices in a predetermined timed sequence, a separate timing means for interposing an additional time delay in the sequential starting of said devices, and means for rendering said separate time delay means ineffective upon a predetermined abnormal variation in said load.

4. In combination, a plurality of boiler furnaces connected to supply steam to a common steam header and each having an automatic burner mechanism for establishing combustion to generate steam therein, means responsive to predetermined variations of the steam pressure in said header, timed sequencing means controlled by said pressure responsive means for starting and stopping operation of said automatic burner mechanism in a predetermined timed sequence, a separate timing means for interposing an additional time delay in the sequential starting of said automatic burner mechanism, and pressure responsive means operable when the steam pressure in said header is below a predetermined value for rendering said separate timing means inoperative.

5. In combination, a plurality of electrically controlled automatic combustion heaters connected to a common heating load, switch mechanism having an off position and a plurality of circuit closing positions for selectively connecting said heaters for operation in different sequences, automatic means responsive to predetermined variations in said heating load, and electrically operated switching means controlled by said automatic means and electrically interlocked with said selective switch mechanism to be rendered effective upon operation of said selective switch mechanism from the off position to one of said circuit closing positions for starting and stopping operation of said heaters in the sequence determined by said selective switching means.

6. In combination, a plurality of automatic combustion heaters connected to a common heating load and a load responsive control device having means for starting said heaters in operation sequentially as the load increases through a predetermined series of values and having means for stopping operation of the heaters sequentially as the load decreases through a lower predetermined series of values.

7. The combination of a plurality of electrically controlled combustion heaters connected to a common heating load, a movable switch member having one series of circuit controlling contacts for energizing said heaters in a predetermined sequence and a separate series of cooperating circuit controlling contacts for deenergizing said heaters in reverse sequence, and means responsive to variations in said heating load for operating said member.

8. In combination, a plurality of automatic combustion heaters connected to a common heating load, means responsive to predetermined variations in said heating load and having a movable control member operable through a series of control positions, and control means operable upon movement of said member in one direction to each control position for energizing a corresponding heater and operable upon movement of said member in the reverse direction from predetermined control positions past adjacent control positions for deenergizing the heaters corresponding to said predetermined positions.

9. The combination of a plurality of automatically operable oil fired boiler furnaces connected to a common stream header and each having a separately operable electromagnetic switch for automatically starting and stopping operation of the corresponding furnace, control switch mechanism operable responsively to predetermined variations of pressure in said steam header and having a member movable through a series of circuit controlling positions for successively energizing said electromagnetic switches to start operation of said furnaces in a predetermined sequence, and means whereby movement of said movable member in the reverse direction from predetermined circuit controlling positions beyond the next adjacent position is required to deenergize the electromagnetic switch corresponding to said predetermined positions.

10. In combination, a plurality of separately operable electromagnetic switches, a dial switch having a contact arm movable in one direction over one series of stationary contacts for energizing said electromagnetic switches in a predetermined sequence and movable in the opposite direction over another series of contacts in offset relation with said one series of contacts for deenergizing said electromagnetic switches in the reverse sequence at a different position of said movable contact arm.

11. In combination a plurality of electro-responsive devices, each having current limiting means in the energizing circuit thereof, a master switch having a series of circuit making positions for energizing said electroresponsive devices in a predetermined sequence, switching means operated by each device for maintaining the device energized independently of said master switch mechanism, said master switch mechanism having a second series of circuit making contacts for short circuiting said electroresponsive devices in the oppostie sequence.

12. The combination of a plurality of automatically fired boiler furnace units for suppling steam to a common header and each having a separably operable valve for disconnecting the unit from said common steam header, automatic means responsive to predetermined variations in the steam pressure of said header for starting and stopping operation of said units in sequence, separate means responsive to the steam pressure of each boiler furnace unit with the corresponding disconnecting valve closed for automatically stopping operation thereof when said pressure reaches an excessive value, and means responsive to pressure in said steam header for automatically stopping operation of all of the units when the steam pressure reaches a predetermined lower value.

13. In a heating system, the combination of a plurality of automatically operable electrically controlled oil fired boiler furnace units for supplying steam to a common header and each having a separately operable valve for disconnecting the unit from said common steam header, automatic means responsive to variations of the steam pressure of said header between predetermined limits for starting and stopping operation of said unit in sequence, safety means responsive to steam pressure of said main above said upper limit for automatically stopping operation of all of said units, and separately operable means responsive to generation of a still higher value of steam pressure in each of said units when the corresponding disconnecting valve is closed for automatically stopping operation of said unit independently of the control of said safety steam pressure responsive means.

14. In a heating system, the combination of a plurality of automatic ignition combustion units operable in sequence for supplying a variable heating load, a common flue for said combustion units having a variable speed electric motor driven fan for inducing a draft therein, control means for initiating operation of said fan at low speed, automatic means responsive to the variations in said heating load and rendered effective upon operation of said control means for starting and stopping operation of said combustion units in a predetermined sequence and means under the control of said automatic means for increasing and decreasing the operating speed of said fan upon the starting and stopping respectively of predetermined units in the sequence.

15. In a system of the class described, in combination, a plurality of power consuming devices, control means for sequentially placing said power consuming devices in operation, and means operable upon a failure of power for causing a sequential replacing of said power consuming devices in operation upon resumption of power.

16. In a system of the class described, in combination, a plurality of power consuming devices, a plurality of control devices therefor, motor means for sequentially actuating said control devices, load responsive means for controlling said motor means, and means responsive to the power supply for temporarily dominating the control of said load responsive means over said motor means upon the occurrence of a predetermined condition in said power supply.

17. In a system of the class described, in combination, a plurality of power consuming devices, a plurality of control devices therefor, motor means for sequentially actuating said control devices, load responsive means for controlling said motor means in a manner to cause the power consuming devices to be sequentially placed in operation upon increase in load, and means operable upon a failure of power for causing said motor means to sequentially replace said power consuming devices in operation.

18. In a system of the class described, in combination, a plurality of power consuming devices, a plurality of control devices therefor, motor means for sequentially actuating said control devices, load responsive means for controlling said motor means in a manner to cause the power consuming devices to be sequentially placed in operation upon increase in load, and means operable upon a failure of power for operating said motor means independently of said load responsive means to a position in which the power consuming devices are out of operation, and for then restoring the control of said motor means to said load responsive means.

19. In a system of the class described, a plurality of control devices, motor means for sequentially actuating said control devices, condition responsive means controlling said motor means for causing sequential actuation of said control devices in a predetermined program in accordance with the condition to which it is responsive, and means responsive to the medium controlled by said control devices also controlling said motor means.

20. In a system of the class described, a plurality of control devices, step control means for sequentially actuating said control devices, condition responsive means for controlling said step control means, and means responsive to the medium controlled by said control device for causing recycling of said step control means upon the occurrence of a predetermined condition of such medium.

21. In a system of the class described, in combination, a plurality of control devices, means for sequentially actuating said control devices, motor means for positioning said actuating means, control means for said motor means, and means operable upon the occurrence of a predetermined condition for operating said motor means independently of the control means to move said actuating means to a predetermined position, and for then restoring the control of said motor means to said control means.

22. In a system of the class described, in combination, a controller, motor means for actuating said controller, control means for said motor means, and means operable upon the occurrence of a predetermined condition for operating said motor means independently of said control means to a predetermined position and for then restoring the control of said motor means to said control means.

23. In a system of the class described, in combination, power consuming means, a controller for said power consuming means, motor means for actuating said controller, load responsive means for controlling said motor means, and means operable upon a failure of power for causing operation of said motor means independently of said load responsive means in a direction to position said controller for preventing supply of power to said consuming means, and means for then restoring the control of said motor means to said load responsive means.

24. In a system of the class described, in combination, power consuming means, control means for progressively controlling said power consuming means, and means operable upon a failure and subsequent resumption of power for progressively replacing said power consuming means in operation.

25. In a system of the class described, in combination, a progressive control device, motor means for actuating said progressive control device, control means for said motor means, means for placing said control means out of operation and for causing said motor means to move said progressive control device towards a predetermined position, and control means automatically actuated upon the progressive control device reaching the predetermined position, for replacing said control means in control of said motor means.

26. In a system of the class described, in combination, a plurality of control devices, movable means for sequentially actuating said control devices, motor means for driving said movable means, control means for controlling said motor means, means for placing said control means out of operation and for causing said motor means to drive said movable means towards a predetermined position, and means automatically actuated upon the movable means reaching said predetermined positon for replacing said control means in control of said motor means.

27. In a system of the class described, in combination, a progressive control device, motor means for actuating said progressive control device, control means for said motor means, means responsive to the condition of the medium controlled by said progressive control device for placing said control means out of operation upon said condition varying to a predetermined value, said condition responsive means also causing said motor means to move said progressive control device towards a predetermined position, and control means automatically actuated upon the progressive control device reaching the predetermined position, for replacing said control means in control of said motor means.

28. In a system of the class described, in combination, a plurality of control devices, movable means for sequentially actuating said control devices, motor means for driving said movable means, control means for controlling said motor means, means responsive to the condition of the medium controlled by at least one of said control devices for placing said control means out of operation upon such condition varying to a predetermined value, said condition responsive means also causing said motor means to drive said movable means toward a predetermined position, and means automatically actuated upon the movable means reaching said predetermined position for replacing said control means in control of said motor means.

29. In a system of the class described, in combination, a power consuming means, progressive control means for said power consuming means, motor means for actuating said progressive control means, load responsive means for controlling said motor means to position said progressive control means in accordance with load conditions, and means operable upon failure of power for placing said load responsive means out of operation and for operating said motor means to run said progressive means towards "off" position, and means actuated upon said progressive control means reaching a predetermined position for replacing said load responsive means in control of said motor means.

30. In a system of the class described, in combination, a plurality of power consuming devices, sequential control means for sequentially placing said power consuming devices in operation, motor means for actuating said sequential control means, load responsive means for controlling said motor means to cause actuation of said sequential control means upon change in load, means operable upon failure of power for placing said load responsive means out of operation and for energizing said motor means to drive said sequential control means towards "off" position, and means actuated upon said sequential control means reaching a predetermined position for replacing said load responsive means in control of said motor means.

HARRY R. CRAGO.

CERTIFICATE OF CORRECTION.

Reissue No. 21,569. September 17, 1940.

HARRY R. CRAGO.

It is hereby certified that error appears in the printed specification of the above numbered patent requiring correction as follows: Page 2, first column, line 31, for "panel 12" read --panel 32--; page 3, first column, line 30, for the word "resistor" read --resistors--; page 4, first column, line 35, for "pressuer" read --pressure--; line 44, for "contact" read --contactor--; page 7, first column, line 2, for "branches" read --branch--; line 73, for "switch" read --switches--; and second column, line 68, claim 1, for "sequenching" read --sequencing--; page 8, second column, line 15, claim 9, for the word "stream" read --steam--; line 53, claim 11, for "oppostie" read --opposite--; line 55, claim 12, for suppling" read --supplying--; page 10, first column, line 2, claim 26, for "positon" read --position--; and that the said Letters Patent should be read with this correction therein that the same may conform to the record of the case in the Patent Office.

Signed and sealed this 29th day of October, A. D. 1940.

Henry Van Arsdale, (Seal) Acting Commissioner of Patents.